(12) United States Patent
Wu et al.

(10) Patent No.: US 12,502,794 B2
(45) Date of Patent: Dec. 23, 2025

(54) THREE-AXIS ROBOT

(71) Applicant: AAC Microtech (Changzhou) Co., Ltd., Jiangsu (CN)

(72) Inventors: Chongdeng Wu, Changzhou (CN); Xueyuan Zhu, Changzhou (CN)

(73) Assignee: AAC Microtech (Changzhou) Co., Ltd., Changzhou (CN)

( * ) Notice: Subject to any disclaimer, the term of this patent is extended or adjusted under 35 U.S.C. 154(b) by 208 days.

(21) Appl. No.: 18/338,369

(22) Filed: Jun. 21, 2023

(65) Prior Publication Data

US 2024/0217123 A1    Jul. 4, 2024

Related U.S. Application Data

(63) Continuation of application No. PCT/CN2023/075320, filed on Feb. 10, 2023.

(30) Foreign Application Priority Data

Dec. 30, 2022    (CN) .......................... 202211722926.2

(51) Int. Cl.
  *B25J 17/02*    (2006.01)
  *B25J 9/12*    (2006.01)

(52) U.S. Cl.
  CPC ............. *B25J 17/0283* (2013.01); *B25J 9/12* (2013.01)

(58) Field of Classification Search
  CPC ........... B25J 9/123; B25J 9/12; B25J 17/0283

USPC ....................................................... 74/490.03
See application file for complete search history.

(56) References Cited

FOREIGN PATENT DOCUMENTS

| CN | 114851233 A | * | 8/2022 | .......... B25J 15/0019 |
| JP | H0215894 A | * | 1/1990 | |
| JP | 2004195620 A | * | 7/2004 | ............... B23Q 1/58 |

OTHER PUBLICATIONS

Written Opinion of the International Search Authority for PCT/CN2023/075320 (Year: 2022).*

* cited by examiner

*Primary Examiner* — T. Scott Fix
(74) *Attorney, Agent, or Firm* — Wiersch Law Group

(57) ABSTRACT

Provided is a three-axis robot including a base plate, a first guiding unit extending along first direction, a first slider, a first driver driving the first slider to move along first direction, a second guiding unit extending along second direction, a second slider, a second driver driving the second slider to move along second direction, a third guiding unit extending along third direction, and the first, second and third directions are perpendicular to each other, a third slider, and a third driver driving the third slider to move along third direction. The first guiding unit and the first driver are provided on the base plate, the second guiding unit and the second driver are provided on the first slider, and the third guiding unit and the third driver are provided on the second slider, so that the three-axis robot has compact structure, improved rigidity and occupies less space.

8 Claims, 3 Drawing Sheets

THREE-AXIS ROBOT

TECHNICAL FIELD

The present disclosure relates to the field of robots and, particularly, relates to a three-axis robot.

BACKGROUND

Conventional three-axis robot includes an orthogonal three-axis structure formed by directly assembling three single-axis robots or three single axis motion modules. Such a three-axis robot is not compact and occupies a large space.

SUMMARY

An objective of the present disclosure is to provide a three-axis robot having a compact structure and occupies less space.

Embodiments of the present disclosure provide a three-axis robot. The three-axis robot includes: a base plate; a first guiding unit provided on the base plate and extending along a first direction; a first slider connected to the first guiding unit to realize guiding fitting; a first driver provided on the base plate, an output end of the first driver being connected to the first slider to drive the first slider to move along the first direction; a second guiding unit provided on the first slider and extending along a second direction; a second slider connected to the second guiding unit to realize guiding fitting; a second driver provided on the first slider, an output end of the second driver being connected to the second slider to drive the second slider to move along the second direction; a third guiding unit provided on the second slider and extending along a third direction, the first direction, the second direction and the third direction are perpendicular to each other; a third slider connected to the third guiding unit to realize guiding fitting; and a third driver provided on the second slider, an output end of the third driver being connected to the third slider to drive the third slider to move along the third direction.

As an improvement, the first driver includes a first driving motor, a first fixing seat, a first driving screw, a first screw nut, a first bearing seat, and a first coupling. The first fixing seat is provided on the base plate, the first driving motor is fixed to the first fixing seat, an output shaft of the first driving motor is connected to the first driving screw through the first coupling, the first driving screw is rotationally supported by the first bearing seat, the first screw nut is in threaded fitting with the first driving screw, and the first slider is fixedly connected to the first screw nut.

As an improvement, the first fixing seat is provided with a first accommodating cavity, the first accommodating cavity includes a first opening and a first through hole, the first opening is provided on a first side wall of the first fixing seat, at least a part of the first slider extends into the first accommodating cavity through the first opening, the first through hole is provided on a second side wall of the first fixing seat, the first bearing seat passes through the first through hole, and the first driving motor is fixed to an outer surface of the second side wall.

As an improvement, the second driver includes a second driving motor, a second driving screw, a second screw nut, a second bearing seat, and a second coupling. The second driving motor is fixed on the first slider, an output shaft of the second driving motor is connected to the second driving screw through the second coupling, the second driving screw is rotationally supported by the second bearing seat, the second screw nut is in threaded fitting with the second driving screw, and the second slider is fixedly connected to the second screw nut.

As an improvement, the first slider is provided with a second accommodating cavity, the second driving motor is fixed to a top of the first slider, the second driving screw and the second screw nut are both accommodated in the second accommodating cavity, the second accommodating cavity includes a second opening and a second through hole, the second opening is provided on a first side wall of the second accommodating cavity, the second through hole is provided on a second side wall of the second accommodating cavity, the second guiding unit is provided on an outer surface of the first side wall, the second screw nut is provided with a connection block passing through the second opening and then connected to the third slider, and the first screw nut is fixed in the second through hole.

As an improvement, the third driver includes a third driving motor provided on the second slider, a third driving screw, a third screw nut, a third bearing seat and a third coupling. An output shaft of the third driving motor is connected to the third driving screw through the third coupling, the third driving screw is rotationally supported by the third bearing seat, the third screw nut is in threaded fitting with the third driving screw, and the third slider is directly or indirectly connected to the second screw nut.

As an improvement, the third driving motor is fixed to a top of the second slider, the output shaft of the third driving motor extends along the second direction, an adapter block is fixed to the third screw nut, the second slider is provided with a fourth guiding unit extending along the second direction, the third slider is provided with a fifth guiding unit extending along a fourth direction that has a preset angle with the third direction, and the fourth guiding unit and the fifth guiding unit are respectively connected to the adapter block.

As an improvement, the second slider is provided with a third accommodating cavity, and the third driving screw, the third screw nut, the adapter block and the fourth guiding unit are accommodated in the third accommodating cavity.

As an improvement, each of the first guiding unit, the second guiding unit, the third guiding unit, the fourth guiding unit, and the fifth guiding unit is a cross guiding rail pair or a straight guiding rail pair.

As an improvement, a starting end of each of movement paths of the first slider, the second slider and the third slider is provided with a zero return switch, and a terminal end of each of the movement paths of the first slider, the second slider and the third slider is provided with a limit switch.

The first guiding unit and the first driver are arranged on the base plate, the second guiding unit and the second driver are arranged on the first slider, and the third guiding unit and the third driver are arranged in the second slider. As a result, the three-axis robot has a compact structure and an improved rigidity and occupies less space.

REFERENCE SIGNS

Figure 1:
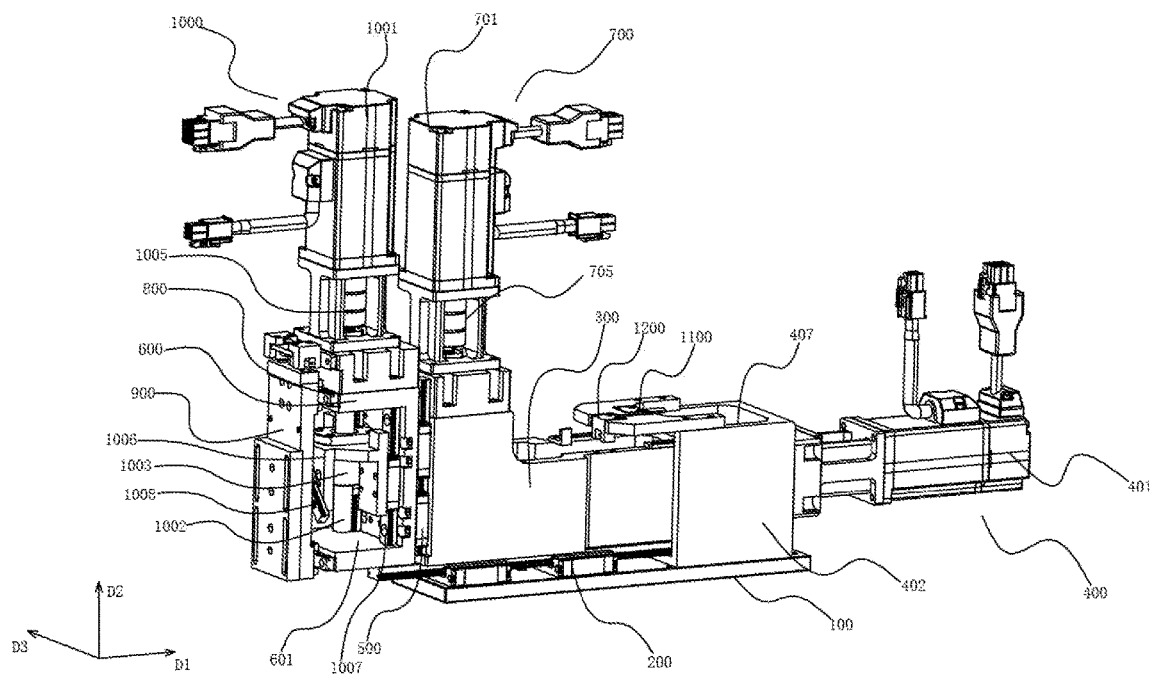
FIG. 1 is a perspective view of a three-axis robot according to one or more embodiments of the present disclosure.
Figure 2:
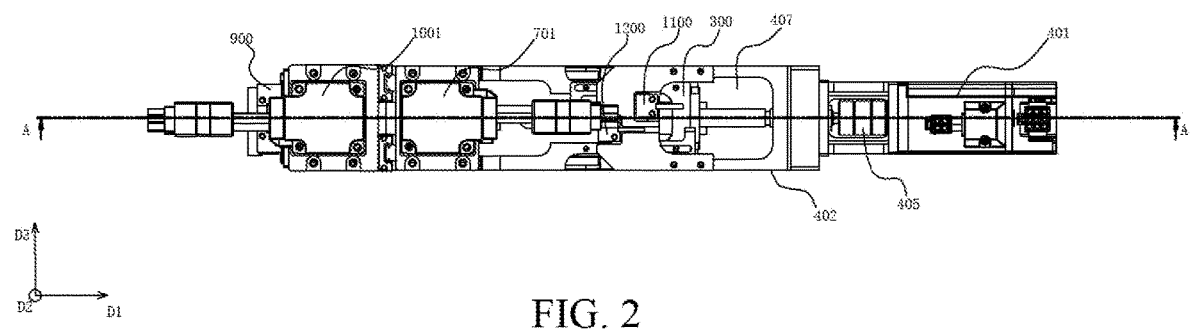
FIG. 2 is a top view of a three-axis robot according to one or more embodiments of the present disclosure.

100: base plate;
200: first guiding unit;
300: first slider; 301: second accommodating cavity; 302: second opening; 303: second through hole;
400: first driver; 401: first driving motor; 402: first fixing seat; 403: first driving screw; 404: first screw nut; 405: first bearing seat; 406: first coupling; 407: first accommodating cavity; 408: first opening; 409: first through hole;
500: second guiding unit;
600: second slider; 601: third accommodating cavity;
700: second driver; 701: second driving motor; 702: second driving screw; 703: second screw nut; 704: second bearing seat; 705: second coupling; 706: connection block;
800: third guiding unit;
900: third slider;
1000: third driver; 1001: third driving motor; 1002: third driving screw; 1003: third screw nut; 1004: third bearing seat; 1005: third coupling; 1006: adapter block; 1007: fourth guiding unit; 1008: fifth guiding unit;
1100: zero return switch;
1200: limit switch;
D1: first direction; D2: second direction; D3: third direction.

DESCRIPTION OF EMBODIMENTS

The embodiments described hereafter with reference to the drawings are illustrative, merely used for explaining the present invention and should not be regarded as any limitations thereto.

Embodiments of the present disclosure provide a three-axis robot. As shown in FIG. 1 to FIG. 4, the three-axis robot includes a base plate 100, a first guiding unit 200, a first slider 300, a first driver 400, a second guiding unit 500, a second slider 600, a second driver 700, a third guiding unit 800, a third slider 900, and a third driver 1000.

The base plate 100 is a horizontally extending flat plate structure and serves as a base for supporting and mounting the three-axis robot.

The first guiding unit 200 is provided on the base plate 100 and extends along a first direction D1. In some embodiments, the first direction D1 is parallel to the horizontal plane.

A bottom of the first slider 300 is connected to the first guiding unit 200 to realize guiding fitting. The first guiding unit 200 provides limiting and guiding functions, such that the first slider 300 moves only along the first direction D1.

The first driver 400 is provided on the base plate 100. An output end of the first driver 400 is connected to the first slider 300 to drive the first slider 300 to move along the first direction D1.

The second guiding unit 500 is provided on a side end of the first slider 300 and extends along a second direction D2. The second direction D2 is parallel to a vertical plane.

A side end of the second slider 600 is connected to the second guiding unit 500 to realize guiding fitting. The second guiding unit 500 provides limiting and guiding functions, such that the second slider 600 moves only along the second direction D2.

The second driver 700 is provided on the first slider 300. An output end of the second driver 700 is connected to the second slider 600 to drive the second slider 600 to move along the second direction D2.

The third guiding unit 800 is provided on a side end of the second slider 600 and extends along a third direction D3. The first direction D1, the second direction D2 and the third direction D3 are perpendicular to one another. The first direction D1, the second direction D2 and the third direction D3 are three coordinate axes of a 3D coordinate system. For example, the first direction D1 is the extending direction of the X axis, the second direction D2 is the extending direction of the Y axis, and the third direction D3 is the extending direction of the Z axis.

The third slider 900 is connected to the third guiding unit 800 to realize guiding fitting. The third guiding unit 800 provides limiting and guiding functions, such that the third slider 900 moves only along the third direction D3. The third slider 900 is provided with an end actuator (not shown). In some embodiments, the second slider 600 is provided with an output adapter unit for connecting to the end actuator. By replacing the output adapter unit, different types of end actuators can be applied to the robot.

The third driver 1000 is provided on the second slider 600. An output end of the third driver 1000 is connected to the third slider 900 to drive the third slider 900 to move along the third direction D3.

Based on the above embodiments, the operating process of the three-axis robot is as follows.

The first driver 400 operates and drives the first slider 300 to move along the first direction D1, such that the end actuator on the third slider 900 moves to a preset position in the first direction D1. The second driver 700 operates and drives the second slider 600 to move along the second direction D2, such that the end actuator on the third slider 900 moves to a preset position in the second direction D2. The third driver 1000 operates and drives the third slider 900 to move along the third direction D3, such that the end actuator on the third slider 900 moves to a preset position in the third direction D3. In this way, the end actuator can move in the three directions independently.

With the configuration the first guiding unit 200 and the first driver 400 are arranged on the base plate 100, the second guiding unit 500 and the second driver 600 are arranged on the first slider 300, and the third guiding unit 800 and the third driver 1000 are arranged in the second slider 600, the three-axis robot has a compact structure and an improved rigidity and occupies less space.

Figure 3:
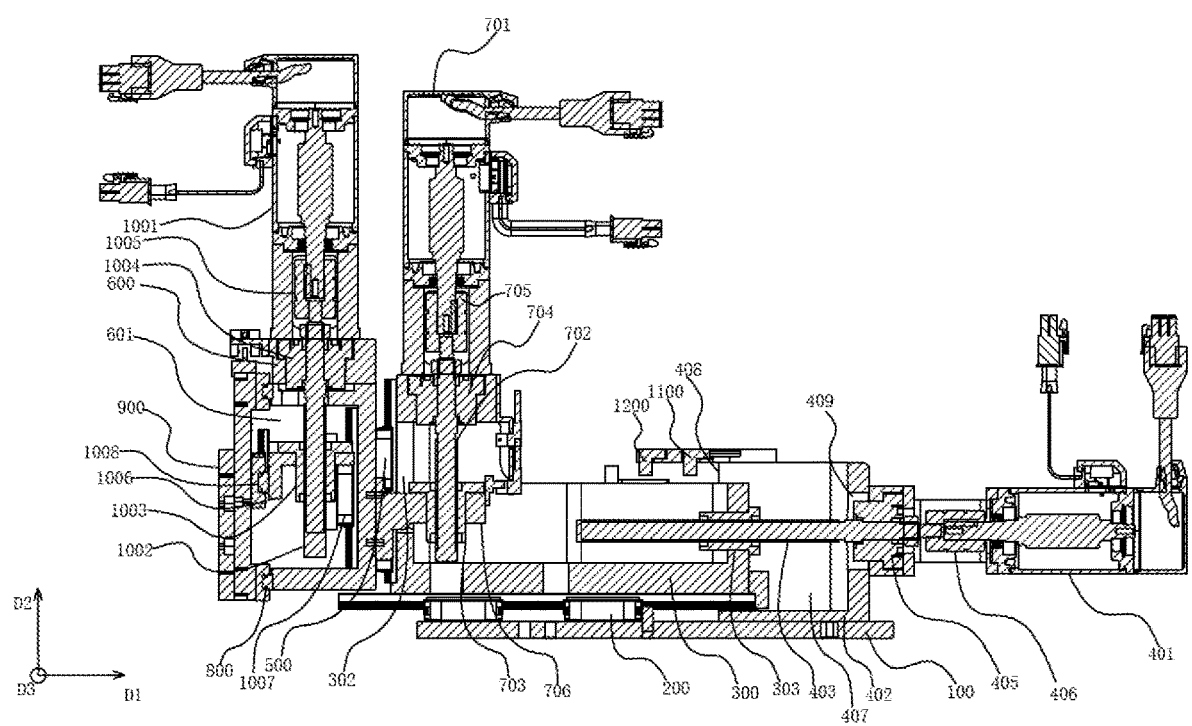
FIG. 3 is a cross sectional view of a three-axis robot taken along line A-A in FIG. 2.
Figure 4:
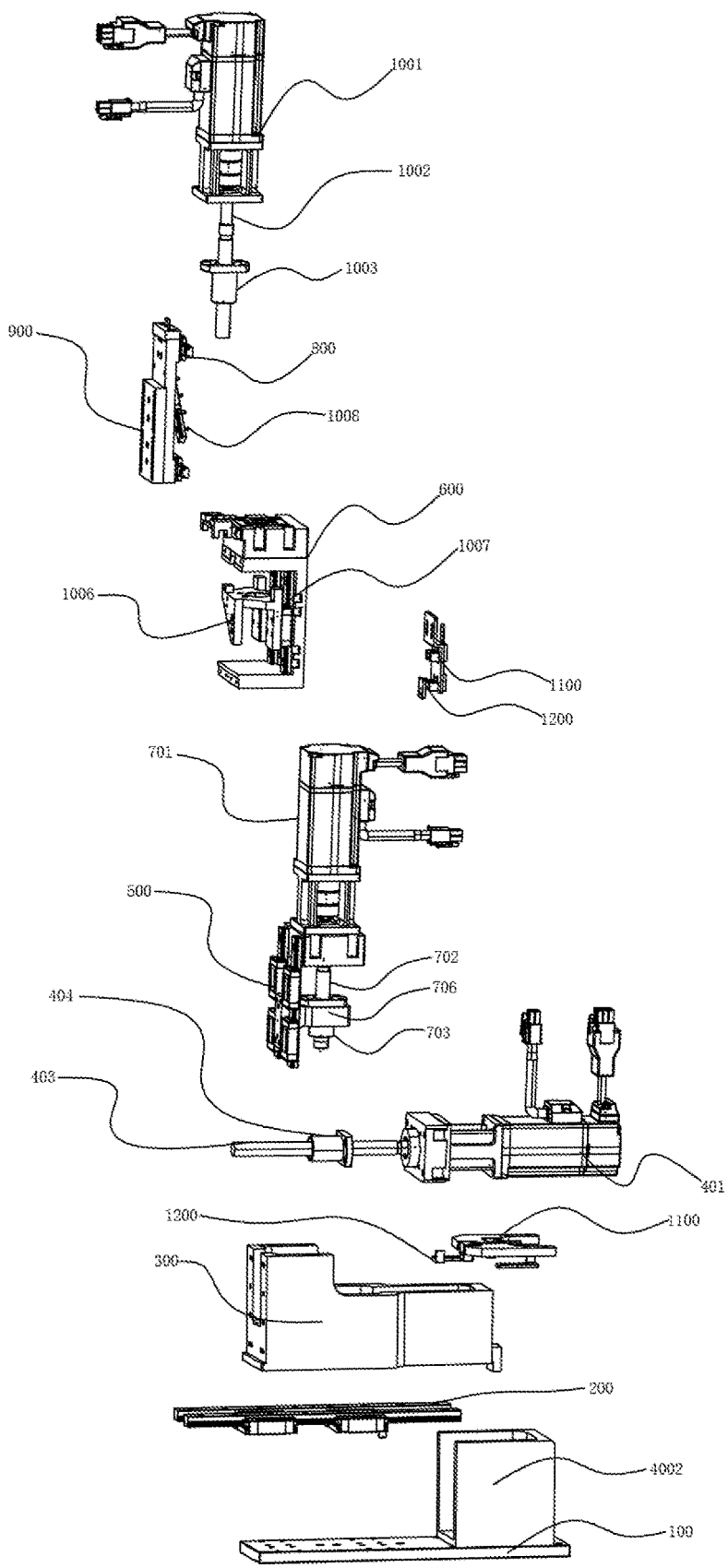
FIG. 4 is an exploded view of a three-axis robot according to one or more embodiments of the present disclosure.

In some embodiments, as shown in FIG. 3, the first driver 400 includes a first driving motor 401, a first fixing seat 402, a first driving screw 403, a first screw nut 404, a first bearing seat 405, and a first coupling 406. The first fixing seat 402 is provided on the base plate 100. The first driving motor 401 is fixed to the first fixing seat 402. In order to ensure the precise and stable operation of the first driving motor 401, the first driving motor 401 may be a servo motor. An output shaft of the first driving motor 401 is connected to the first driving screw 403 through the first coupling 406. The first driving screw 403 is rotationally supported by the first bearing seat 405. The extending direction of the first driving screw 403 is parallel to the first direction D1. The first screw nut 404 is in threaded fitting with the first driving screw 403. The first slider 300 is fixedly connected to the first screw nut 404.

When the first driving motor 401 operates, power is transferred to the first driving screw 403 through the first coupling 406, and the first driving screw 403 is driven to rotate. With the threaded connection between the first driving screw 403 and the first screw nut 404, the rotation of the first driving screw 403 is converted to a horizontal movement of the first screw nut 404 along the axial direction of the first driving screw 403, and thus the first slider 300 moves along the first direction D1. In this way, the coordinate of the end actuator in the first direction D1 is adjusted.

In some embodiments, as shown in FIG. 3, the first fixing seat 402 is provided with a first accommodating cavity 407. The first accommodating cavity 407 includes a first opening 408 and a first through hole 409. The first opening 408 is provided on a first side wall of the first fixing seat 402. At least a part of the first slider 300 extends into the first accommodating cavity 407 through the first opening 408. This configuration can save the space occupied by the robot. When moving along the first direction D1, a part of the first slider 300 is accommodated in the first accommodating cavity 407 of the first fixing seat 402, thereby reducing the length of the robot and protecting the first slider 300. The first through hole 409 is provided on a second side wall of the first fixing seat 402. The first bearing seat 405 passes through the first through hole 409. The first driving motor 401 is fixed to an outer surface of the second side wall. An end of the first driving screw 403 is connected to the first driving motor 401 through the first coupling 406, and the other end of the first driving screw 403 is within the first accommodating cavity 407.

In some embodiments, the second driver 700 includes a second driving motor 701, a second driving screw 702, a second screw nut 703, a second bearing seat 704, and a second coupling 705. The second driving motor 701 is fixed on the first slider 300. In order to ensure the precise and stable operation of the second driving motor 701, the second driving motor 701 may be a servo motor. An output shaft of the second driving motor 701 is connected to the second driving screw 702 through the second coupling 705. The second driving screw 702 is rotationally supported by the second bearing seat 704. The extending direction of the second driving screw 702 is parallel to the second direction D2. The second screw nut 703 is in threaded fitting with the second driving screw 702, and the second slider 600 is fixedly connected to the second screw nut 703.

When the second driving motor 701 operates, power is transferred to the second driving screw 702 through the second coupling 705, and the second driving screw 702 is driven to rotate. With the threaded connection between the second driving screw 702 and the second screw nut 703, the rotation of the second driving screw 702 is converted to a horizontal movement of the second screw nut 703 along the axial direction of the second driving screw 702, and thus the second slider 600 moves along the second direction D2. In this way, the coordinate of the end actuator in the second direction D2 is adjusted.

In some embodiments, as shown in FIG. 3, the first slider 300 is provided with a second accommodating cavity 301. The second driving motor 701 is fixed to a top of the first slider 300. The second driving screw 702 and the second screw nut 704 are both accommodated in the second accommodating cavity 301, such that the space occupied by the robot is reduced, and the structure is more compact. The second accommodating cavity 301 includes a second opening 302 and a second through hole 303. The second opening 302 is provided on a first side wall of the second accommodating cavity 301, and the second through hole 303 is provided on a second side wall of the second accommodating cavity 301. The second through hole 302 is provided on a second side wall of the second accommodating cavity 301.

The second guiding unit 500 is provided on an outer surface of the first side wall. The second screw nut 703 is provided with a connection block 706 passing through the second opening 302 and then connected to the third slider 900. The second opening 302 avoids limitation to the up-and-down movement of the second slider 600. The first screw nut 404 is fixed in the second through hole 303. An end of the first driving screw 403 is connected to the first driving motor 401 through the first coupling 406, and the other end of the first driving screw 403 extends into the second accommodating cavity 301 passing through the first accommodating cavity 407.

In some embodiments, as shown in FIG. 1 and FIG. 3, the third driver 1000 includes a third driving motor 1001, a third driving screw 1002, a third screw nut 1003, a third bearing seat 1004 and a third coupling 1005. The third driving motor 1001 is fixed on the second slider 600. In order to ensure the precise and stable operation of the third driving motor 1001, the third driving motor 1001 may be a servo motor. An output shaft of the third driving motor 1001 is connected to the third driving screw 1002 through the third coupling 1005. The third driving screw 1002 is rotationally supported by the third bearing seat 1004. The extending direction of the third driving screw 1002 is parallel to the third direction D3. The third screw nut 1003 is in threaded fitting with the third driving screw 1002, and the third slider 900 is directly or indirectly connected to the second screw nut 1003.

When the third driving motor 1001 operates, power is transferred to the third driving screw 1002 through the third coupling 1005, and the third driving screw 1002 is driven to rotate. With the threaded connection between the third driving screw 1002 and the third screw nut 1003, the rotation of the third driving screw 1002 is converted to movement of the third screw nut 1003 along the axial direction of the third driving screw 1002, and thus the third slider 900 moves along the third direction D3. In this way, the coordinate of the end actuator in the third direction D3 is adjusted.

In some embodiments, as shown in FIG. 1 to FIG. 4, the third driving motor 1001 is fixed to a top of the second slider 600 and arranged at a same side as the second driving motor 701. In this way, the space occupied by the robot and the width of the robot are reduced, and thus the overall structure of the robot is more compact. The output shaft of the third driving motor 1001 extends along the second direction D2. An adapter block 1006 is fixed to the third screw nut 1003. The second slider 600 is provided with a fourth guiding unit 1007 extending along the second direction D2. The third slider 900 is provided with a fifth guiding unit 1008 extending along a fourth direction that has a preset angle with the third direction D3. The fourth guiding unit 1007 and the fifth guiding unit 1008 are respectively connected to the adapter block 1006. The fourth guiding unit 1007 guides the adapter block 1006 to only move vertically up and down along the second direction D2. During the up-and-down movement of the adapter block 1006, the fifth guiding unit 1008 supplies to the third slider 900 a component force in the third direction D3. Due to the concurrent limitation of the third guiding unit 800, the third slider 900 can only move along the third direction D3. In this way, the third slider 900 is driven to move.

In some embodiments, the second slider 600 is provided with a third accommodating cavity 601. The third driving screw 1002, the third screw nut 1003, the adapter block 1006 and the fourth guiding unit 1007 are all accommodated in the third accommodating cavity 601. In this way, the space occupied by the robot is reduced, and structure of the robot is more compact.

In some embodiments, each of the first guiding unit 200, the second guiding unit 500, the third guiding unit 800, the fourth guiding unit 1007, and the fifth guiding unit 1008 is a cross guiding rail pair or a straight guiding rail pair. The cross guiding rail pair includes: a stationary rail, a sliding rail, and a roller retainer. The stationary rail and the sliding rail are respectively connected to two sides of the roller retainer though a V-shaped groove. The sliding rail is slidable with respect to the stationary rail by means of the roller retainer. The straight guiding rail pair includes a guiding rail body and a sliding block slidably provided on the straight guiding rail.

In some embodiments, as shown in FIG. 1 to FIG. 4, a starting end of each of the movement paths of the first slider 300, the second slider 600 and the third slider 900 is provided with a zero return switch 1100. The zero return switch 1100 is used for determining the starting reference point of the first slider 300, the second slider 600 and the third slider 900. The zero return switches 1100 serves as the original point of the motion of the robot. Each time the robot is powered on, the zero-returning action is triggered. Returning to the starting reference point is one of important functions of the robot. Whether the robot can accurately return to the starting reference point will affect the processing quality of the robot. For the structure of the zero return switch 1100, reference can be made to related arts, and will not be repeated here.

In some embodiments, a terminal end of the movement paths of the first slider 300, the second slider 600 and the third slider 900 is provided with a limit switch 1200 for limiting the moving displacement distances of the first slider 300, the second slider 600 and the third slider 900. With the limit switch 1200, the movements of the first slider 300, the second slider 600 and the third slider 900 are safe, reliable and stable. For the structure of the limit switch 1200, reference can be made to related arts, and will not be repeated here.

The structure, features and effects of the present disclosure are described in detail above according to the embodiments shown in the drawings. The above are only preferred embodiments of the present disclosure, but the present disclosure does not limit the scope of implementation as illustrated in the drawings. Any changes made in accordance with the conception of the present disclosure, or equivalent embodiments modified as equivalent changes, which still do not exceed the spirit covered by the specification and the drawings, shall fall within the protection scope of the present disclosure.

What is claimed is:

1. A three-axis robot comprising:
a base plate;
a first guiding unit provided on the base plate and extending along a first direction;
a first slider connected to the first guiding unit to realize guiding fitting;
a first driver provided on the base plate, an output end of the first driver being connected to the first slider to drive the first slider to move along the first direction;
a second guiding unit provided on the first slider and extending along a second direction;
a second slider connected to the second guiding unit to realize guiding fitting;
a second driver provided on the first slider, an output end of the second driver being connected to the second slider to drive the second slider to move along the second direction;
a third guiding unit provided on the second slider and extending along a third direction, wherein the first direction, the second direction and the third direction are perpendicular to each other;
a third slider connected to the third guiding unit to realize guiding fitting; and
a third driver provided on the second slider, an output end of the third driver being connected to the third slider to drive the third slider to move along the third direction;
the second driver is fixed on an end of the first slider away from the base along the second direction; the second driver comprises a second driving motor, a second driving screw, a second screw nut, a second bearing seat, and a second coupling, the second driving motor is fixed on the first slider, an output shaft of the second driving motor is connected to the second driving screw through the second coupling, the second driving screw is rotationally supported by the second bearing seat, the second screw nut is in threaded fitting with the second driving screw, and the second slider is fixedly connected to the second screw nut;
the third driver is fixed on an end of the second slider away from the base along the second direction; third driver comprises a third driving motor provided on the second slider, a third driving screw, a third screw nut, a third bearing seat and a third coupling, an output shaft of the third driving motor is connected to the third driving screw through the third coupling, the third driving screw is rotationally supported by the third bearing seat, the third screw nut is in threaded fitting with the third driving screw, and the third slider is directly or indirectly connected to the second screw nut;
the second driving screw and the third driving screw are both extended along the second direction.

2. The three-axis robot according to claim 1, wherein the first driver comprises a first driving motor, a first fixing seat, a first driving screw, a first screw nut, a first bearing seat, and a first coupling, wherein the first fixing seat is provided on the base plate, the first driving motor is fixed to the first fixing seat, an output shaft of the first driving motor is connected to the first driving screw through the first coupling, the first driving screw is rotationally supported by the first bearing seat, the first screw nut is in threaded fitting with the first driving screw, and the first slider is fixedly connected to the first screw nut.

3. The three-axis robot according to claim 1, wherein the first fixing seat is provided with a first accommodating cavity, the first accommodating cavity comprises a first opening and a first through hole, the first opening is provided on a first side wall of the first fixing seat, at least a part of the first slider extends into the first accommodating cavity through the first opening, the first through hole is provided on a second side wall of the first fixing seat, the first bearing seat passes through the first through hole, and the first driving motor is fixed to an outer surface of the second side wall.

4. The three-axis robot according to claim 1, wherein the first slider is provided with a second accommodating cavity, the second driving motor is fixed to a top of the first slider, the second driving screw and the second screw nut are both accommodated in the second accommodating cavity, the second accommodating cavity comprises a second opening and a second through hole, the second opening is provided on a first side wall of the second accommodating cavity, the second through hole is provided on a second side wall of the second accommodating cavity, the second guiding unit is provided on an outer surface of the first side wall, the second screw nut is provided with a connection block passing through the second opening and then connected to the third slider, and the first screw nut is fixed in the second through hole.

5. The three-axis robot according to claim 1, wherein the third driving motor is fixed to a top of the second slider, the output shaft of the third driving motor extends along the second direction, an adapter block is fixed to the third screw nut, the second slider is provided with a fourth guiding unit extending along the second direction, the third slider is provided with a fifth guiding unit extending along a fourth direction that has a preset angle with the third direction, and the fourth guiding unit and the fifth guiding unit are respectively connected to the adapter block.

6. The three-axis robot according to claim 5, wherein the second slider is provided with a third accommodating cavity, and the third driving screw, the third screw nut, the adapter block and the fourth guiding unit are accommodated in the third accommodating cavity.

7. The three-axis robot according to claim 5, wherein each of the first guiding unit, the second guiding unit, the third guiding unit, the fourth guiding unit, and the fifth guiding unit is a cross guiding rail pair or a straight guiding rail pair.

8. The three-axis robot according to claim 1, wherein a starting end of each of movement paths of the first slider, the second slider and the third slider is provided with a zero return switch, and a terminal end of each of the movement paths of the first slider, the second slider and the third slider is provided with a limit switch.

\* \* \* \* \*